United States Patent
Tang et al.

(10) Patent No.: US 12,353,251 B2
(45) Date of Patent: Jul. 8, 2025

(54) ELECTRONIC DEVICE

(71) Applicant: Honor Device Co., Ltd., Shenzhen (CN)

(72) Inventors: Yangjie Tang, Shenzhen (CN); Xuyang Wang, Shenzhen (CN); Yameng Wei, Shenzhen (CN); Lei Feng, Shenzhen (CN); Xuewen Yin, Shenzhen (CN); Linquan Ping, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/246,402

(22) PCT Filed: Sep. 7, 2022

(86) PCT No.: PCT/CN2022/117458
§ 371 (c)(1),
(2) Date: Mar. 23, 2023

(87) PCT Pub. No.: WO2023/040715
PCT Pub. Date: Mar. 23, 2023

(65) Prior Publication Data
US 2023/0359251 A1      Nov. 9, 2023

(30) Foreign Application Priority Data
Sep. 18, 2021   (CN) .......................... 202111112843.7

(51) Int. Cl.
*G06F 1/16* (2006.01)
*H04M 1/02* (2006.01)
(Continued)

(52) U.S. Cl.
CPC .......... *G06F 1/1658* (2013.01); *G06F 1/1688* (2013.01); *H04M 1/026* (2013.01);
(Continued)

(58) Field of Classification Search
CPC .... G06F 1/1658; G06F 1/1688; H04M 1/026; H04M 1/025; H04M 1/03; H04R 2499/11
(Continued)

(56) References Cited

U.S. PATENT DOCUMENTS 10,848,857 B2    11/2020  Brandston
11,765,495 B2 *   9/2023  Pine .................... H04R 1/1041
                                                381/380
(Continued)

FOREIGN PATENT DOCUMENTS

CN       103517165 A      1/2014
CN       204697267 U     10/2015
(Continued)

*Primary Examiner* — Sean H Nguyen
(74) *Attorney, Agent, or Firm* — Conley Rose, P.C.

(57) ABSTRACT

An electronic device may include a mobile phone, a tablet computer, a handheld computer, a walkie-talkie, a POS machine, an event data recorder, a wearable device, a virtual reality device, or in-vehicle original equipment or another terminal product with a loudspeaker. An inner wall of a mounting cavity for mounting a loudspeaker and the loudspeaker are respectively provided with mating surfaces that adapt to each other. In the two mating surfaces, one is provided with a flexible sealing member and a limiting structure, and the other is provided with a rigid sealing member. When the loudspeaker is mounted, the rigid sealing member can move relative to the flexible sealing member along a first direction, until the rigid sealing member is mated with the flexible sealing member. The limiting structure can restrict the flexible sealing member from moving.

20 Claims, 5 Drawing Sheets

(51) Int. Cl.
  *H04M 1/03* (2006.01)
  *H04R 1/02* (2006.01)
(52) U.S. Cl.
  CPC .............. *H04M 1/03* (2013.01); *H04R 1/025* (2013.01); *H04R 2499/11* (2013.01)
(58) Field of Classification Search
  USPC ........................................................ 381/386
  See application file for complete search history.

(56) References Cited

U.S. PATENT DOCUMENTS

| | | | |
|---|---|---|---|
| 2013/0051601 A1* | 2/2013 | Hill | H04R 1/2892 381/365 |
| 2013/0271902 A1* | 10/2013 | Lai | H05K 5/0086 361/679.01 |
| 2014/0376758 A1* | 12/2014 | Barcel | H04R 1/023 381/334 |
| 2019/0342645 A1 | 11/2019 | Jung et al. | |
| 2023/0319452 A1* | 10/2023 | Xue | H04R 1/1016 381/374 |

FOREIGN PATENT DOCUMENTS

| | | |
|---|---|---|
| CN | 106686506 A | 5/2017 |
| CN | 206894832 U | 1/2018 |
| CN | 108508979 A | 9/2018 |
| CN | 207968771 U | 10/2018 |
| CN | 105828548 B | 4/2019 |
| CN | 208723945 U | 4/2019 |
| CN | 209375910 U | 9/2019 |
| CN | 110491285 A | 11/2019 |
| CN | 110572752 A | 12/2019 |
| CN | 210274426 U | 4/2020 |
| CN | 210745477 U | 6/2020 |
| CN | 112616099 A | 4/2021 |
| CN | 213305455 U | 5/2021 |
| CN | 113140156 A | 7/2021 |
| CN | 213638129 U | 7/2021 |
| CN | 111968513 A | 4/2022 |
| WO | 2020118065 A1 | 6/2020 |
| WO | 2021120670 A1 | 6/2021 |
| WO | 2021129882 A1 | 7/2021 |

\* cited by examiner

ELECTRONIC DEVICE

CROSS-REFERENCE TO RELATED APPLICATIONS

This application is a U.S. National Stage of International Application No. PCT/CN2022/117458 filed on Sep. 7, 2022, which claims priority to Chinese Patent Application No. 202111112843.7, filed with the China National Intellectual Property Administration on Sep. 18, 2021 and entitled "ELECTRONIC DEVICE", both of which are incorporated herein by reference in their entireties.

TECHNICAL FIELD

This application relates to the field of electronic product technologies, and in particular, to an electronic device.

BACKGROUND

In an electronic device provided with a loudspeaker such as a mobile phone, a mounting cavity adapted to the loudspeaker is usually provided. After the loudspeaker is mounted in the mounting cavity, a sound output channel of the loudspeaker can be connected to a sound output channel provided on a sidewall of the mounting cavity. A sealing portion is provided at a connection joint of the sound output channels to provide sealing protection on the entire device, thereby preventing external liquid or dust from entering the electronic device along the sound output channels.

In a conventional technology, the sealing portion is a silicone sealing rib. The silicone sealing rib is adhesively fastened to an inner wall of the mounting cavity. After the loudspeaker is mounted in the mounting cavity, a mating surface of the loudspeaker can abut against and be mated with the silicone sealing rib, to implement sealing at the connection joint of the sound output channels. However, in an assembly process of the loudspeaker, the loudspeaker needs to be mounted in the mounting cavity from outside in along a depth direction. In this process, the loudspeaker may scratch the silicone sealing rib, resulting in deformation or displacement of the soft silicone sealing rib. Consequently, the sealing protection function cannot be implemented, and a risk of liquid entering the entire device is greatly increased.

To avoid the foregoing problem, in the conventional technology, an avoidance notch is provided at a bottom of one end of the loudspeaker that is away from the sound output channel. During mounting, the entire loudspeaker is in an inclined state, and an end of the loudspeaker that is provided with the mating surface is inclined towards the inside of the mounting cavity and directly placed at a location at a height that enables mating with the silicone sealing rib. The avoidance notch can avoid interference with the sidewall of the mounting cavity in this case. Then, the end of the loudspeaker that is provided with the avoidance notch is pushed towards the inside of the mounting cavity, so that the entire loudspeaker is located in the mounting cavity. Although such arrangement can reduce scratching on the silicone sealing rib by the loudspeaker in the mounting process, the loudspeaker needs to be provided with the avoidance notch in this arrangement. A volume of the loudspeaker is affected, and a sound output effect of the electronic device is further affected.

SUMMARY

Embodiments of this application provide an electronic device, to facilitate assembly of a loudspeaker, avoid impact caused by the assembly of the loudspeaker to sealing protection at a connection joint of sound output channels, and further ensure a sound output effect of the electronic device.

According to an aspect, an embodiment of this application provides an electronic device, including a body portion and a loudspeaker. The body portion is provided with a mounting cavity for mounting the loudspeaker, an inner wall of the mounting cavity and the loudspeaker each are correspondingly provided with a mating surface, and the mating surfaces are respectively provided channels capable of being mutually connected. The two mating surfaces are respectively a first mating surface and a second mating surface, the first mating surface is provided with a limiting structure and a flexible sealing member provided along a circumferential direction of the channel, the second mating surface is provided with a rigid sealing member provided along a circumferential direction of the channel, the two mating surfaces are capable of moving relative to each other so that the rigid sealing member is mated with the flexible sealing member in a sealing manner, the limiting structure is configured to restrict the flexible sealing member from moving relative to the first mating surface along a first direction, and the first direction is a direction along which the rigid sealing member moves relative to the flexible sealing member.

The limiting structure can restrict the flexible sealing member from moving relative to the first mating surface along the first direction. When the loudspeaker is mounted in the mounting cavity, the loudspeaker can be directly mounted from outside in along a depth direction of the mounting cavity. The loudspeaker does not need to be inclined, and the mounting operations are convenient. In addition, relative locations of the flexible sealing member and the first mating surface can be prevented from changes caused by scratching in a mounting process. This ensures a sealing protection effect after mounting is completed, requires no structural change of the loudspeaker, and ensures a sound output effect of the electronic device.

Based on the aspect, this embodiment of this application further provides a first implementation of the aspect:

the first mating surface is provided with a mounting groove, the flexible sealing member is provided in the mounting groove, and a groove wall of the mounting groove forms the limiting structure. This arrangement can limit movement of the flexible sealing member while simplifying an overall structure.

Based on the first implementation of the aspect, this embodiment of this application further provides a second implementation of the aspect:

a depth of the mounting groove is not less than a thickness of the flexible sealing member, and the rigid sealing member protrudes from the second mating surface. With this arrangement, the entire flexible sealing member can be located in the mounting groove. In a process of mounting the loudspeaker, the rigid sealing member and the flexible sealing member do not scratch each other before being mated. This ensures location stability of the flexible sealing member, and can further reduce mounting resistance between the first mating surface and the second mating surface, thereby facilitating the mounting operations of the loudspeaker.

Based on the first implementation of the aspect, this embodiment of this application further provides a third implementation of the aspect:

the flexible sealing member is adhesively fastened to an inner wall of the mounting groove by using a first adhesive layer. This simplifies an operation process.

Based on any one of the aspect and the first to the third implementations of the aspect, this embodiment of this application further provides a fourth implementation of the aspect:

the flexible sealing member is a silicone sealing gasket. This arrangement features low costs and good economic efficiency.

Based on any one of the aspect and the first to the third implementations of the aspect, this embodiment of this application further provides a fifth implementation of the aspect:

the second mating surface is integrally formed with an annular convex rib, and the annular convex rib forms the rigid sealing member. This arrangement can simplify the overall structure and a machining process.

Based on the fifth implementation of the aspect, this embodiment of this application further provides a sixth implementation of the aspect:

a side end of the annular convex rib that faces the first mating surface is a smooth arc structure. This arrangement can avoid damage to the flexible sealing member when the annular convex rib abuts against the flexible sealing member.

Based on the sixth implementation of the aspect, this embodiment of this application further provides a seventh implementation of the aspect:

a cross section of the annular convex rib tapers from a side of the second mating surface to a side of the first mating surface. With this arrangement, when the end of the annular convex rib that faces the first mating surface has a smaller width, an abutment area between the end and the flexible sealing member can be reduced, and a deformation amount of the flexible sealing member can be increased, thereby ensuring a sealing effect.

Based on any one of the aspect and the first to the seventh implementations of the aspect, this embodiment of this application further provides an eighth implementation of the aspect:

the electronic device further includes a dust filter provided between the first mating surface and the second mating surface, where the dust filter is capable of blocking the channel provided on the inner wall of the mounting cavity. The dust filter plays a dust-proof function on the channel, to prevent dust outside a first channel of a middle frame from entering the channel, thereby providing protection on the loudspeaker.

Based on the eighth implementation of the aspect, this embodiment of this application further provides a ninth implementation of the aspect:

the dust filter is adhesively fastened to the mating surface on the inner wall of the mounting cavity by using a second adhesive layer. This arrangement can simplify the overall structure and a mounting technology.

Based on any one of the aspect and the first to the ninth implementations of the aspect, this embodiment of this application further provides a tenth implementation of the aspect:

the mating surface of the mounting cavity and the mating surface of the loudspeaker are both inclined surfaces that adapt to each other, and an end of the mating surface of the mounting cavity that faces an opening is inclined towards the outside of the mounting cavity. This arrangement facilitates smooth mounting of the loudspeaker, and reduces contact sliding between the two mating surfaces and between the rigid sealing member and the flexible sealing member, thereby reducing an acting force applied by the rigid sealing member to scratch the flexible sealing member, and facilitating the mounting operations while ensuring the sealing protection effect after the mounting.

BRIEF DESCRIPTION OF DRAWINGS

To describe technical solutions in embodiments of this application or in the conventional technology more clearly, the following briefly describes accompanying drawings required for describing embodiments or the conventional technology. Apparently, the accompanying drawings in the following description show some embodiments of the present invention, and a person of ordinary skill in the art can still derive other drawings from these accompanying drawings without creative efforts.

DESCRIPTION OF REFERENCE NUMERALS
IN FIG. 1 TO FIG. 10

1: body portion; 2: middle frame; 3: battery compartment; 4: loudspeaker; 5: first mating surface; 51: first channel; 52: mounting groove; 53: first adhesive layer; 54: limiting structure; 6: second mating surface; 61: second channel; 7: flexible sealing member; 8: rigid sealing member; 81: arc structure; 9: sound output channel; and 10: dust filter.

DESCRIPTION OF EMBODIMENTS

To enable a person skilled in the art to better understand the technical solutions of this application, the following describes this application in further detail with reference to the accompanying drawings and specific embodiments.

An electronic device provided in an embodiment of this application may be a mobile phone or a tablet computer, or may be a handheld computer, a walkie-talkie, a POS machine, an event data recorder, a wearable device, a virtual reality device, or in-vehicle original equipment or another terminal product with a loudspeaker.

The electronic device provided in this embodiment of this application includes a body portion and a loudspeaker. The body portion is provided with a mounting cavity for mounting the loudspeaker. The mounting cavity resembles a groove structure. During mounting, the loudspeaker is placed into the groove structure from outside in along a depth direction of the mounting cavity.

Specifically, an inner wall of the mounting cavity and the loudspeaker each are provided with a mating surface, and the mating surfaces are respectively provided channels capable of being mutually connected. In other words, after the loudspeaker is mounted in the mounting cavity, the mating surface of the mounting cavity is mated with the mating surface of the loudspeaker, and the channel of the mounting cavity is connected to the channel of the loudspeaker to form a sound output channel, so that a sound can be transmitted.

Figure 1:
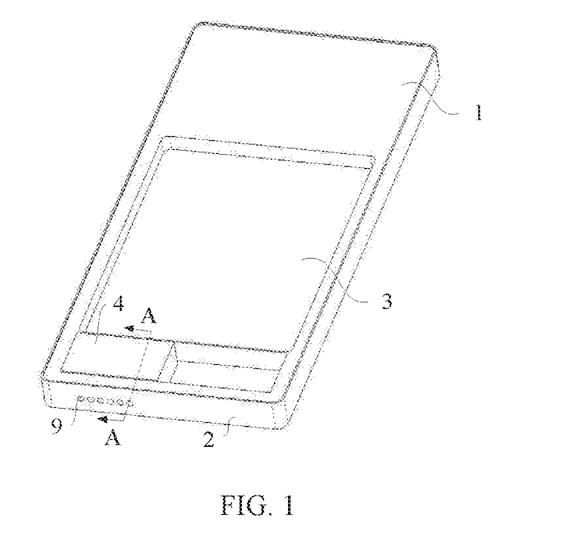
FIG. 1 is a schematic diagram of an internal structure of an electronic device according to an embodiment of this application.

As shown in FIG. 1, for example, the electronic device is a mobile phone. A body portion 1 of the mobile phone includes a middle frame 2 and a battery compartment 3. The mounting cavity is enclosed by an inner wall of the middle frame 2 and an outer wall of the battery compartment 3. A sidewall surface of the middle frame 2 that faces the inside of the mounting cavity forms a mating surface. A loudspeaker 4 is correspondingly provided with a mating surface. A size of the mounting cavity adapts to a size of the loudspeaker 4. After the loudspeaker 4 is mounted in the mounting cavity, the mating surface of the loudspeaker 4 can be mated with the mating surface of the middle frame 2, and a side end face of the loudspeaker 4 that is away from the mating surface can abut against and be mated with a sidewall surface of the mounting cavity that faces the battery compartment 3, thereby ensuring that the loudspeaker 4 can be stably located in the mounting cavity.

Figure 2:
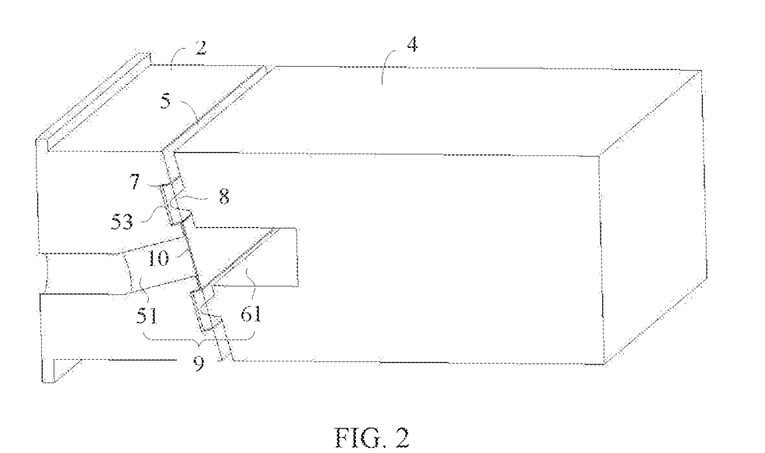
FIG. 2 is a cutaway drawing along A-A in FIG. 1, where a mating surface on a middle frame forms a first mating surface and an end face of a loudspeaker forms a second mating surface.
Figure 6:
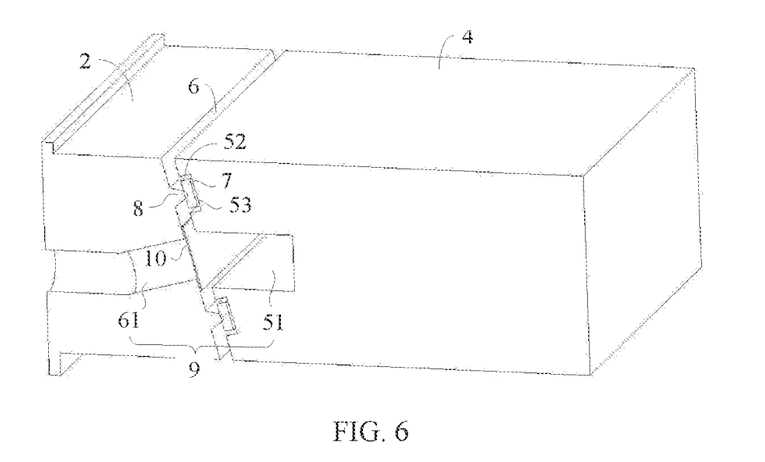
FIG. 6 is a cutaway drawing along A-A in FIG. 1, where a mating surface on a middle frame forms a second mating surface and an end face of a loudspeaker forms a first mating surface.

For ease of description, the two mating surfaces are respectively referred to as a first mating surface 5 and a second mating surface 6. As shown in FIG. 2 and FIG. 6, the first mating surface 5 is provided with a first channel 51, and the second mating surface 6 is provided with a second channel 61. When the two mating surfaces are mated, the first channel 51 is connected to the second channel 61 to form a sound output channel 9. Specifically, the mating surface of the middle frame 2 forms the first mating surface 5 and the mating surface of the loudspeaker 4 forms the second mating surface 6, or the mating surface of the middle frame 2 forms the second mating surface 6 and the mating surface of the loudspeaker 4 forms the first mating surface 5. After assembly, the two mating surfaces can be mated and be relatively fixed, the sound output channel 9 is formed after the channel 51 and channel 61 are connected, and a sealing portion can implement sealing along a circumferential direction at a connection joint of the sound output channel 9, to prevent external liquid or dust from entry.

In detail, the sealing portion includes a flexible sealing member 7 and a rigid sealing member 8. The flexible sealing member 7 is provided on the first mating surface 5 and arranged along a circumferential direction of the first channel 51. The rigid sealing member 8 is fixedly provided on the second mating surface 6 and arranged along a circumferential direction of the second channel 61. During mounting, the first mating surface 5 and the second mating surface 6 can slide relative to each other, until the first channel 51 and the second channel 61 are correspondingly connected, and the corresponding flexible sealing member 7 and rigid sealing member 8 abut against and are mated with each other. In this case, the flexible sealing member 7 and the rigid sealing member 8 can implement sealing along the circumferential directions of the first channel 51 and the second channel 61, thereby completing assembly.

Literally, it can be easily understood that, a material of the flexible sealing member 7 is comparatively soft, and a silicone sealing gasket may be selected as the flexible sealing member 7. The silicone sealing gasket features some elasticity, low costs, and good economic efficiency. A material of the rigid sealing member 8 is comparatively hard. Specifically, plastic, metal, or the like may be selected as the rigid sealing member 8. When the flexible sealing member 7 is mated with the rigid sealing member 8, the rigid sealing member 8 can squeeze the flexible sealing member 7, so that the flexible sealing member 7 is deformed to implement sealing along the circumferential direction at the connection joint of the sound output channel 9. Specifically, the silicone sealing gasket is an annular structure arranged along the circumferential direction of the first channel 51. The rigid sealing member 8 is an annular convex rib provided on the second mating surface 6. The annular convex rib adapts to the silicone sealing gasket. After the annular convex rib abuts against and is mated with the silicone sealing gasket, the annular convex rib can squeeze the silicone sealing gasket to elastically deform the silicone sealing gasket, thereby ensuring sealing performance.

During mounting, the loudspeaker 4 is mounted in the mounting cavity from outside in along a depth direction of the mounting cavity. In this process, the mating surface of the loudspeaker 4 can move relative to the mating surface of the middle frame 2. After the loudspeaker 4 is mounted in place, the flexible sealing member 7 between the two mating surfaces can be mated with the rigid sealing member 8 in a sealing manner. Therefore, in the mounting process, as the two mating surfaces slide relative to each other, more or less relative fitting and sliding exist between the flexible sealing member 7 and the rigid sealing member 8 before the mating. For ease of description, in the mounting process, a direction in which the rigid sealing member 8 moves relative to the flexible sealing member 7 is referred to as a first direction.

Specifically, moving directions of the first mating surface 5 and the second mating surface 6 are opposite. As shown in FIG. 2, when the mating surface of the middle frame 2 forms the first mating surface 5 and is provided with the flexible sealing member 7, and the mating surface of the loudspeaker 4 forms the second mating surface 6 and is provided with the rigid sealing member 8, the first mating surface 5 and the flexible sealing member 7 do not move during mounting, while the second mating surface 6 drives the rigid sealing member 8 to move towards the inside of the mounting cavity relative to the first mating surface 5. In this case, the first direction refers to a direction from outside in along the depth direction of the mounting cavity. With the mounting of the loudspeaker 4, the rigid sealing member 8 has a tendency to scratch the flexible sealing member 7 and make the flexible sealing member 7 move towards an inner side of the mounting cavity relative to the first mating surface 5. As shown in FIG. 6, when the mating surface of the middle frame 2 forms the second mating surface 6 and is provided with the rigid sealing member 8, and the mating surface of the loudspeaker 4 forms the first mating surface 5 and is provided with the flexible scaling member 7, the second mating surface 6 and the rigid sealing member 8 do not move during mounting, and the first mating surface 5 drives the flexible sealing member 7 to move relative to the second mating surface 6. In this case, the first direction refers to a direction from inside out along the depth direction of the mounting cavity. With the mounting of the loudspeaker 4, the rigid sealing member 8 has a tendency to scratch the flexible sealing member 7 and make the flexible sealing member 7 move towards an outer side of the mounting cavity relative to the first mating surface 5.

Figure 3:
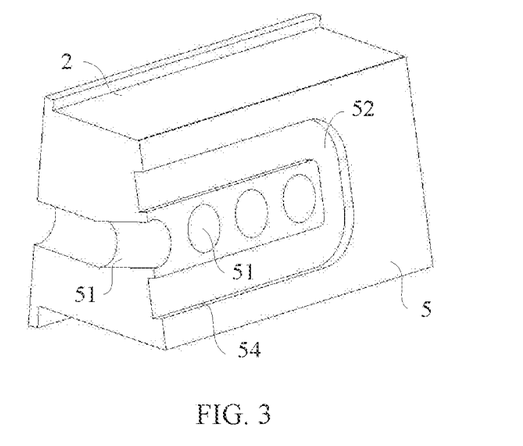
FIG. 3 is a schematic diagram of a structure of the middle frame in FIG. 2.
Figure 7:
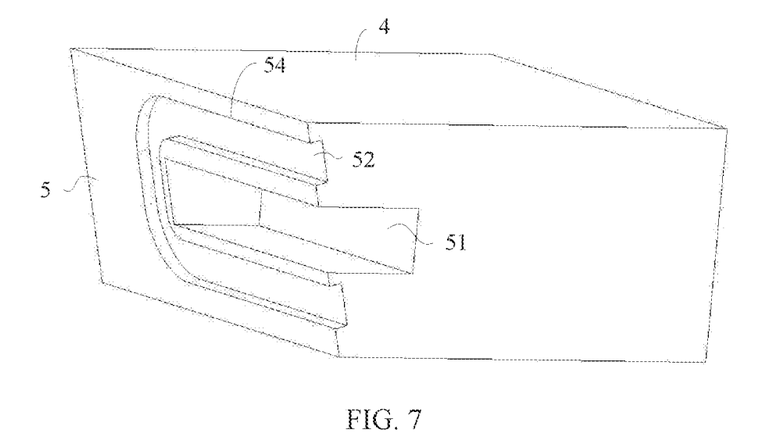
FIG. 7 is a schematic diagram of a structure of the loudspeaker in FIG. 6.

If the rigid sealing member 8 scratches the flexible sealing member 7 in a relative fitting and sliding process before mating between the flexible sealing member 7 and the rigid sealing member 8, a mating failure occurs due to displacement of the flexible sealing member 7. To prevent this case, in this embodiment, as shown in FIG. 3 and FIG. 7, the first mating surface 5 is provided with a mounting groove 52, the mounting groove 52 is arranged along the circumferential direction of the first channel 51, and the mounting groove 52 is configured to mount the flexible sealing member 7. Specifically, when the first direction is the direction from outside in along the depth direction of the mounting cavity, as shown in FIG. 3, a sidewall of the mounting groove 52 that faces an inner side along the depth direction of the mounting cavity forms a limiting structure 54.

Figure 4:
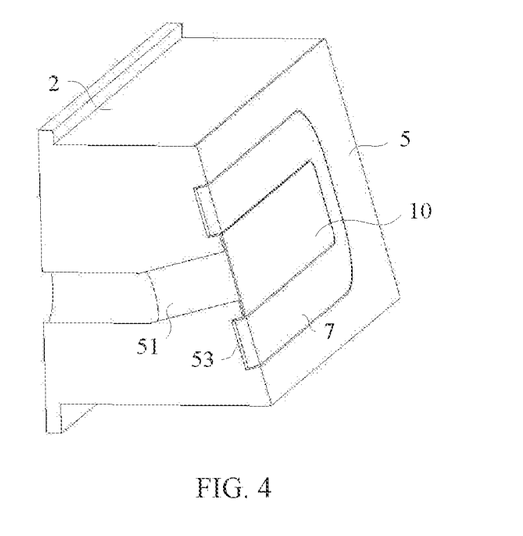
FIG. 4 is a schematic diagram of a structure of the middle frame in FIG. 2 in which a flexible sealing member and a dust filter are mounted.
Figure 8:
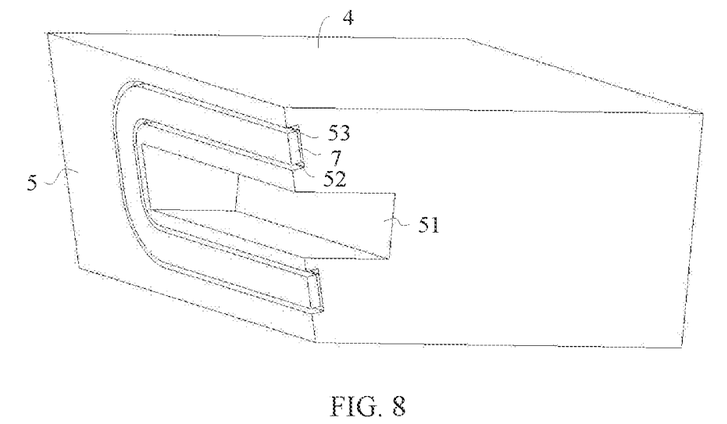
FIG. 8 is a schematic diagram of a structure of the loudspeaker in FIG. 6 in which a flexible sealing member is mounted.

As shown in FIG. 4, when the flexible sealing member 7 is mounted in the mounting groove 52, the limiting structure 54 can restrict the flexible sealing member 7 from moving relative to the first mating surface 5. This ensures location stability of the flexible sealing member 7 in the mounting process of the loudspeaker 4 and ensures that the flexible sealing member 7 and the rigid sealing member 8 can be mated after the loudspeaker 4 is mounted in place. When the first direction is the direction from inside out along the depth direction of the mounting cavity, as shown in FIG. 7, a sidewall of the mounting groove 52 that faces an outer side along the depth direction of the mounting cavity forms a limiting structure 54. As shown in FIG. 8, when the flexible sealing member 7 is mounted in the mounting groove 52, the limiting structure 54 can restrict the flexible sealing member 7 from moving relative to the first mating surface 5. This ensures location stability of the flexible sealing member 7 in the mounting process of the loudspeaker 4 and ensures that the flexible sealing member 7 and the rigid sealing member 8 can be mated after the loudspeaker 4 is mounted in place.

In addition, as shown in FIG. 2 and FIG. 6, the mating surface of the middle frame 2 and the mating surface of the loudspeaker 4 are both inclined surfaces that adapt to each other. Specifically, a top end (an end facing an opening of the mounting cavity) of the mating surface of the middle frame 2 is inclined towards an outer side of the mounting cavity. In other words, a cross-sectional area of an opening end of the mounting cavity is greater than a cross-sectional area of a bottom end. In this way, when the loudspeaker 4 is mounted, as a space at the opening end is large, at first the mating surface of the loudspeaker 4 is not in contact with the mating surface of the middle frame 2. In addition, before the loudspeaker 4 is mounted in place, there is still a gap between the mating surface of the loudspeaker 4 and the mating surface of the middle frame 2, and the rigid sealing member 8 and the flexible sealing member 7 are not fully mated. This arrangement enables smooth mounting of the loudspeaker 4, and reduces contact sliding between the two mating surfaces and between the rigid sealing member 8 and the flexible sealing member 7, thereby reducing an acting force applied by the rigid sealing member 8 to scratch the flexible sealing member 7, and facilitating the mounting operations while ensuring a sealing protection effect after the mounting.

Therefore, in the electronic device provided in this embodiment, when the loudspeaker 4 is mounted in the mounting cavity, the loudspeaker 4 can be directly mounted from outside in along the depth direction of the mounting cavity. The loudspeaker 4 does not need to be inclined, and the mounting operations are convenient. In addition, with the arrangement of the limiting structure 54, relative locations of the flexible sealing member 7 and the first mating surface 5 can be prevented from changes caused by scratching in a mounting process. This ensures a sealing protection effect after mounting is completed, requires no structural change of the loudspeaker 4, and ensures a sound output effect of the electronic device.

A depth of the mounting groove 52 is not less than a thickness of the flexible sealing member 7, in other words, the entire flexible sealing member 7 is located in the mounting groove 52 and does not protrude from the first mating surface 5, and the rigid sealing member 8 protrudes from the second mating surface 6. During mounting, since the flexible sealing member 7 does not protrude from the first mating surface 5, when the rigid sealing member 8 slides along the first mating surface 5, the rigid sealing member 8 does not scratch the flexible sealing member 7, until the two mating surfaces move relative to each other in place, and the rigid sealing member 8 is mated with the flexible sealing member 7. In this case, a side end of the rigid sealing member 8 that faces the first mating surface 5 can just enter the mounting groove 52 and abut against and be mated with the flexible sealing member 7, thereby ensuring a sealing effect.

When the two mating surfaces are mated, the side end of the rigid sealing member 8 that faces the first mating surface 5 may partially enter the mounting groove 52 and abut against and be mated with the flexible sealing member 7. In this case, a gap may be left between the two mating surfaces. Alternatively, when the two mating surfaces are mated, the rigid sealing member 8 may fully enter the mounting groove 52 and abut against and be mated with the flexible sealing member 7. In this case, the two mating surfaces fit with each other.

In this embodiment, the depth of the mounting groove 52 may alternatively be less than the thickness of the flexible sealing member 7. In this case, a portion of the flexible sealing member 7 protrudes out of the mounting groove 52, that is, a portion of the flexible sealing member 7 protrudes from the first mating surface 5. During mounting, when the rigid sealing member 8 slides relative to the first mating surface 5, the rigid sealing member 8 can scratch the flexible sealing member 7 protruding from the first mating surface 5. Nevertheless, due to a limiting function of a groove wall of the mounting groove 52, the flexible sealing member 7 is not displaced at a location of the first mating surface 5, and the sealing protection effect after mounting in place can be ensured.

Alternatively, in this embodiment, the foregoing limiting structure 54 may be formed by providing a stopper (not shown in the figure) on the first mating surface 5. The stopper is specifically provided on a side of the flexible sealing member 7 that faces the first direction. When the first direction is outside in along the depth direction of the mounting cavity, the stopper is provided on a side of the flexible sealing member 7 that faces the inside of the mounting cavity. When the first direction is from inside out along the depth direction of the mounting cavity, the stopper is provided on a side of the flexible sealing member 7 that faces the outside of the mounting cavity. Specifically, the stopper may be protruding structures spaced apart or may be a continuous protruding structure, provided that the stopper can restrict the flexible sealing member 7 from being displaced at the location of the first mating surface 5 when being scratched by the rigid sealing member 8.

The arrangement of the mounting groove 52 can simplify an overall structure when compared with the arrangement of the stopper. When the entire flexible sealing member 7 is arranged in the mounting groove 52, in a process of mounting the loudspeaker 4, the rigid sealing member 8 and the flexible sealing member 7 do not scratch each other before being mated. This ensures location stability of the flexible sealing member 7, and can further reduce mounting resistance between the first mating surface 5 and the second mating surface 6, thereby facilitating the mounting operations of the loudspeaker 4.

As shown in FIG. 4 and FIG. 8, the flexible sealing member 7 is adhesively fastened to an inner wall (a sidewall and/or a bottom wall) of the mounting groove 52 by using a first adhesive layer 53. In other words, the flexible sealing member 7 is adhesively fastened in the mounting groove 52. This can further ensure that the flexible sealing member 7 can be stably located in the mounting groove 52, thereby further ensuring mounting stability. If the limiting structure 54 is a stopper provided on the first mating surface 5, the flexible sealing member 7 may also be adhesively fastened to the stopper and/or the flexible sealing member 7 may also be adhesively fastened to the first mating surface 5 by using the first adhesive layer 53, to ensure stability of the flexible sealing member 7.

Alternatively, the flexible sealing member 7 may be directly placed in the mounting groove 52. When the depth of the mounting groove 52 is not less than the thickness of the flexible sealing member 7, the entire flexible sealing member 7 can be located in the mounting groove 52. There may be no other connection manner between the flexible sealing member 7 and the mounting groove 52. When the first adhesive layer 53 is used for adhesive fastening, the stability of the flexible sealing member 7 in the mounting groove 52 can be further ensured.

Certainly, in this embodiment, a manner of fastening the flexible sealing member 7 is not limited. For example, the flexible sealing member 7 may also be fastened to the first mating surface 5 by using a fastener. The adhesive fastening using the first adhesive layer 53 can simplify the overall structure and the mounting operations, and can further ensure a sealing effect between the first mating surface 5 and the flexible sealing member 7.

Figure 5:
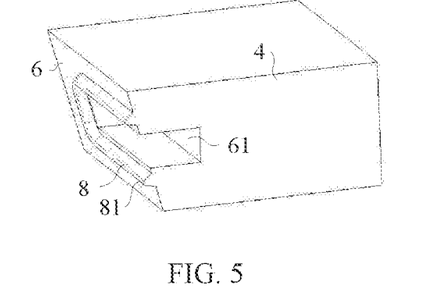
FIG. 5 is a schematic diagram of a structure of the loudspeaker in FIG. 2.
Figure 9:
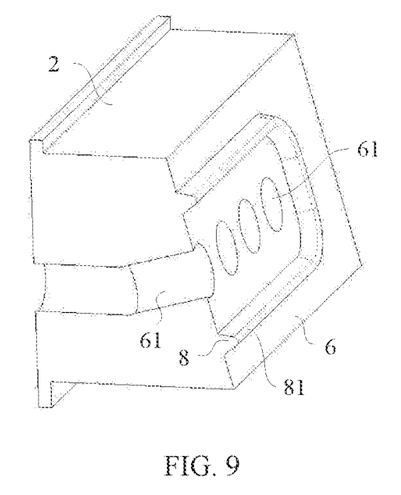
FIG. 9 is a schematic diagram of a structure of the middle frame in FIG. 6.

The rigid sealing member 8 (the annular convex rib) may be fastened to the second mating surface 6 by using a fastener, or may be adhesively fastened to the second mating surface 6. Alternatively, as shown in FIG. 5 and FIG. 9, the annular convex rib and the second mating surface 6 are an integrated structure. This simplifies the overall structure, simplifies a machining process, and further ensures stability of the fastening between the annular convex rib and the second mating surface 6, thereby avoiding displacement of the annular convex rib at a location of the second mating surface 6 during relative movement of the two mating surfaces, and further simplifying an assembly process and improving assembly efficiency.

Aside end of the annular convex rib that faces the first mating surface 5 can abut against the flexible sealing member 7 (the silicone sealing gasket) and elastically deform the flexible sealing member 7. Therefore, as shown in FIG. 5 and FIG. 9, the side end of the annular convex rib that faces the first mating surface 5 is a smooth arc structure 81. This arrangement can avoid damage to the flexible sealing member 7 when the annular convex rib abuts against the flexible sealing member 7.

In addition, a cross section of the annular convex rib tapers from a side of the second mating surface 6 to a side of the first mating surface 5. In other words, a side of the cross section of the annular convex rib that faces the first mating surface 5 has a smaller width. Specifically, the cross section of the annular convex rib may be provided as a triangular structure, as shown in FIG. 5 and FIG. 9. One side of the triangular structure faces the second mating surface 6 (specifically, fitting and fastening or an integrated structure may be used), and an outer wall of a corner corresponding to the side is the smooth arc structure 81 and can abut against the flexible sealing member 7. Alternatively, the cross section of the annular convex rib may be provided as a trapezoidal structure, where a long side thereof is fitted with the second mating surface 6, and a short side thereof can form the smooth transitional arc structure 81 and can also abut against the flexible sealing member 7. When the end of the annular convex rib that faces the first mating surface 5 has a smaller width, an abutment area between the end and the flexible sealing member 7 can be reduced, and a deformation amount of the flexible sealing member 7 can be increased, thereby ensuring a sealing effect.

Specific structures of the first channel 51 and the second channel 61 are not limited. For example, each of the two channels may be provided with only one hole structure, or either of them may be provided with a plurality of hole structures, or both may be provided with a plurality of hole structures. Regardless of a quantity of hole structures provided in each channel, the two channels are correspondingly connected to each other to form the sound output channel 9. The entire sound output channel 9 is located in an annular structure enclosed by the sealing portion, thereby ensuring an overall sealing protection effect. When the two mating surfaces are mated, a hole structure of the middle frame 2 can be connected to a hole structure of the loudspeaker 4 to form the sound output channel 9. The sealing portion can be provided in a sealing manner along a whole outer periphery of the sound output channel 9. As shown in FIG. 9, when a plurality of hole structures are provided in the channel of the middle frame 2, all the hole structures are located in the annular structure enclosed by the sealing portion, thereby ensuring the overall sealing protection effect.

Figure 10:
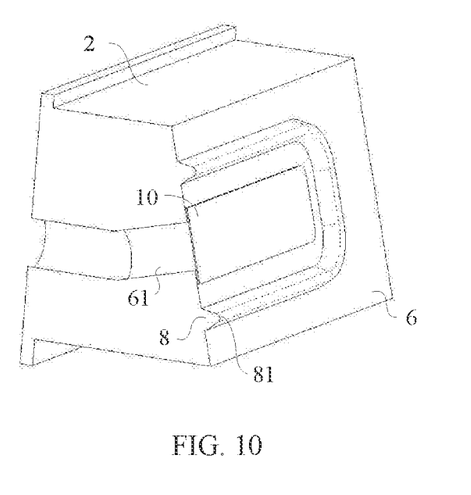
FIG. 10 is a schematic diagram of a structure of the middle frame in FIG. 6 in which a dust filter is mounted.

A dust filter 10 is further provided between the first mating surface 5 and the second mating surface 6. The dust filter 10 can block the channel provided on the inner wall of the mounting cavity. As shown in FIG. 4, the dust filter 10 is fastened to the first mating surface 5 by using a second adhesive layer and blocks the first channel 51. As shown in FIG. 10, the dust filter is fastened to the second mating surface 6 by using a second adhesive layer and blocks the second channel 61. It can be easily understood that, the dust filter 10 is a mesh structure, and can 10 block the sound output channel 9 without affecting the sound output effect of the sound output channel 9. The dust filter 10 can play a dust-proof function on the sound output channel 9, and prevent dust outside the first channel 51 of the middle frame 2 from entering the sound output channel 9, thereby protecting the loudspeaker 4. Certainly, in this embodiment, a specific fastening manner of the dust filter 10 is not limited. For example, the dust filter 10 may be fastened by using a fastener to a mating surface formed on a corresponding inner wall of the mounting cavity, while adhesive fastening using the second adhesive layer can simplify the overall structure and the mounting technology.

The foregoing is merely example implementations of this application. It should be noted that, a person of ordinary skill in the art can further make some improvements and modifications without departing from the principles of this application, and the improvements and modifications shall fall within the protection scope of this application.

What is claimed is:

1. An electronic device, comprising:
   a loudspeaker having a second mating surface; and
   a body portion having a mounting cavity for mounting the loudspeaker, wherein an inner wall of the mounting cavity includes a first mating surface, and the first and second mating surfaces respectively include first and second channels configured to be mutually connected,
   wherein includes a limiting structure, and a flexible sealing member along a circumferential direction of the first channel,
   wherein the second mating surface includes a rigid sealing member along a circumferential direction of the second channel,
   wherein the two mating surfaces are configured to move relative to each other so that the rigid sealing member is mated with the flexible sealing member in a sealing manner,
   wherein the limiting structure is configured to restrict the flexible sealing member from moving relative to the first mating surface along a first direction, and
   wherein the first direction is a direction along which the rigid sealing member moves relative to the flexible sealing member.

2. The electronic device of claim 1, wherein the first mating surface includes a mounting groove, the flexible sealing member is in the mounting groove, and a groove wall of the mounting groove forms the limiting structure.

3. The electronic device of claim 2, wherein a depth of the mounting groove is not less than a thickness of the flexible sealing member, and the rigid sealing member protrudes from the second mating surface.

4. The electronic device of claim 2, wherein the flexible sealing member is adhesively fastened to an inner wall of the mounting groove by a first adhesive layer.

5. The electronic device of claim 1, wherein the flexible sealing member is a silicone sealing gasket.

6. The electronic device of claim 1, wherein the second mating surface is integrally formed with an annular convex rib, and the annular convex rib forms the rigid sealing member.

7. The electronic device of claim 6, wherein a side end of the annular convex rib that faces the first mating surface is a smooth arc structure.

8. The electronic device of claim 7, wherein a cross section of the annular convex rib tapers from a side of the second mating surface to a side of the first mating surface.

9. The electronic device of claim 1, further comprising a dust filter between the first mating surface and the second mating surface, wherein the dust filter is configured to block the channel provided on the inner wall of the mounting cavity.

10. The electronic device of claim 9, wherein the dust filter is adhesively fastened to the first mating surface on the inner wall of the mounting cavity by a second adhesive layer.

11. The electronic device of claim 1, wherein the first and second mating surfaces are both inclined surfaces that adapt to each other, and an end of the first mating surface of the mounting cavity that faces an opening is inclined towards the outside of the mounting cavity.

12. A method, comprising:
    providing a loudspeaker having a second mating surface;
    providing a body portion for an electronic device, wherein the body portion comprises a mounting cavity, wherein an inner wall of the mounting cavity includes a first mating surface, and the first and second mating surfaces respectively include first and second channels configured to be mutually connected,
    wherein the first mating surface includes a limiting structure, and a flexible sealing member along a circumferential direction of the first channel,
    wherein the second mating surface includes a rigid sealing member along a circumferential direction of the second channel,
    wherein the two mating surfaces are configured to move relative to each other so that the rigid sealing member is mated with the flexible sealing member in a sealing manner,
    wherein the limiting structure is configured to restrict the flexible sealing member from moving relative to the first mating surface along a first direction, and
    wherein the first direction is a direction along which the rigid sealing member moves relative to the flexible sealing member.

13. The method of claim 12, further comprising directly mounting the loudspeaker in the mounting cavity from outside in along a depth direction of the mounting cavity.

14. The method of claim 13, wherein the loudspeaker is not inclined during the mounting.

15. The method of claim 12, wherein the first mating surface includes a mounting groove, the flexible sealing member is in the mounting groove, and a groove wall of the mounting groove forms the limiting structure.

16. The method of claim 15, wherein a depth of the mounting groove is not less than a thickness of the flexible sealing member, and the rigid sealing member protrudes from the second mating surface.

17. The method of claim 15, wherein the flexible sealing member is adhesively fastened to an inner wall of the mounting groove by a first adhesive layer.

18. The method of claim 12, wherein the flexible sealing member is a silicone sealing gasket.

19. The method of claim 12, wherein the second mating surface is integrally formed with an annular convex rib, and the annular convex rib forms the rigid sealing member.

20. The method of claim 12, wherein the first and second mating surfaces are both inclined surfaces that adapt to each other, and an end of the first mating surface of the mounting cavity that faces an opening is inclined towards the outside of the mounting cavity.

* * * * *

UNITED STATES PATENT AND TRADEMARK OFFICE
CERTIFICATE OF CORRECTION

PATENT NO. : 12,353,251 B2  
APPLICATION NO. : 18/246402  
DATED : July 8, 2025  
INVENTOR(S) : Yangjie Tang et al.

Page 1 of 1

It is certified that error appears in the above-identified patent and that said Letters Patent is hereby corrected as shown below:

In the Claims

Claim 1, Column 11, Line 8: "wherein includes a limiting" should read "wherein the first mating structure includes a limiting"

Signed and Sealed this  
Twelfth Day of August, 2025

Coke Morgan Stewart  
*Acting Director of the United States Patent and Trademark Office*